Figure 1:
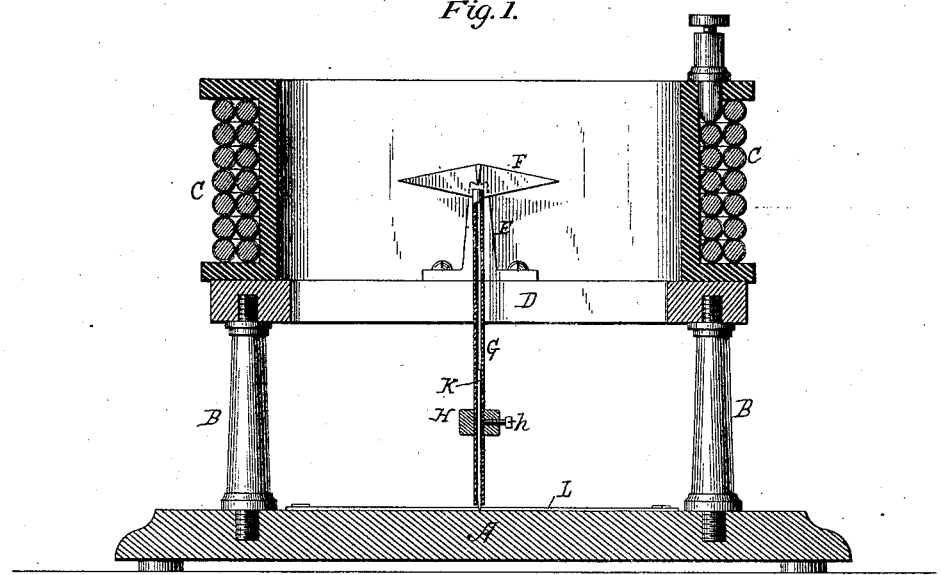

(No Model.)

W. G. DAVID.
GALVANOMETER.

No. 305,431. Patented Sept. 23, 1884.

Attest:
Raymond F. Barnes.
W. H. Hartley.

Inventor:
William G. David
By Parker W. Page
atty.

UNITED STATES PATENT OFFICE.

WILLIAM G. DAVID, OF LYONS, NEW YORK.

GALVANOMETER.

SPECIFICATION forming part of Letters Patent No. 305,431, dated September 23, 1884.

Application filed November 28, 1883. (No model.)

*To all whom it may concern:*

Be it known that I, WILLIAM G. DAVID, a citizen of the United States, and a resident of Lyons, in the county of Wayne and State of New York, have invented certain new and useful Improvements in Galvanometers, of which the following is a specification, reference being had to the drawings accompanying and forming a part of the same.

My invention consists in an apparatus for use in the determination of the strength of electric currents, and for other and similar purposes, the general object of the invention being to produce an instrument of more simple construction than those heretofore used, and one involving less expense and time in its construction.

In carrying out my invention I construct an apparatus operating in the manner of an ordinary tangent-galvanometer, and in describing the nature of the same I will indicate the particular features which distinguish it from instruments of this class.

An ordinary tangent-galvanometer consists of a small magnetic needle suspended or mounted in the center of a comparatively large circle or coil. The instrument is adjusted by setting the coil vertically in the magnetic meridian, the needle lying in the plane of the coil. Upon the passage of a current through the coil the needle is deflected from the plane of the coil, the deflection depending upon the strength of the current passing, and the tangent of the angle of deflection being proportional to the strength of the current. In place of depending upon the magnetism of the earth as the directive force of the needle, a magnet may be employed, which obviates the necessity of adjusting the instrument in the magnetic meridian; but in the instruments heretofore constructed circular graduated scales have been employed, either in conjunction with the needle itself or with a light pointer attached thereto; or when these have been dispensed with the use of apparatus of a more complex and expensive character has been necessitated. The special objects of my invention are, first, to substitute gravity for magnetism as the directive force; and, secondly, to dispense with the circular scales now in use. To accomplish this I mount in the center of a coil or coils a short needle or magnet, supporting the coil in a horizontal position and balancing the needle so that it may lie in the plane of the coil. To the pivotal center of the needle I secure a light hollow pointer provided with an adjustable weight, and in the pointer I insert a pin that may slide in and out of the pointer in line with its length. The passage of a current through the coil of this instrument causes a deflection of the needle from the horizontal position. The pointer will in consequence be turned to an angle from the vertical. Below the pointer is a flat smooth surface, upon which the point of the sliding pin remains in contact, tracing a straight line from the point, upon which it rests when the pointer is in a vertical position. The position of the point of the pin on this line indicates the tangent of the angle to which the needle is deflected, and a scale may be readily laid off to indicate the value of these tangents. This instrument I use as an ammeter or pressure-indicator for electric circuits, for a registering-meter of current strength, or similar purposes.

Figure 2:
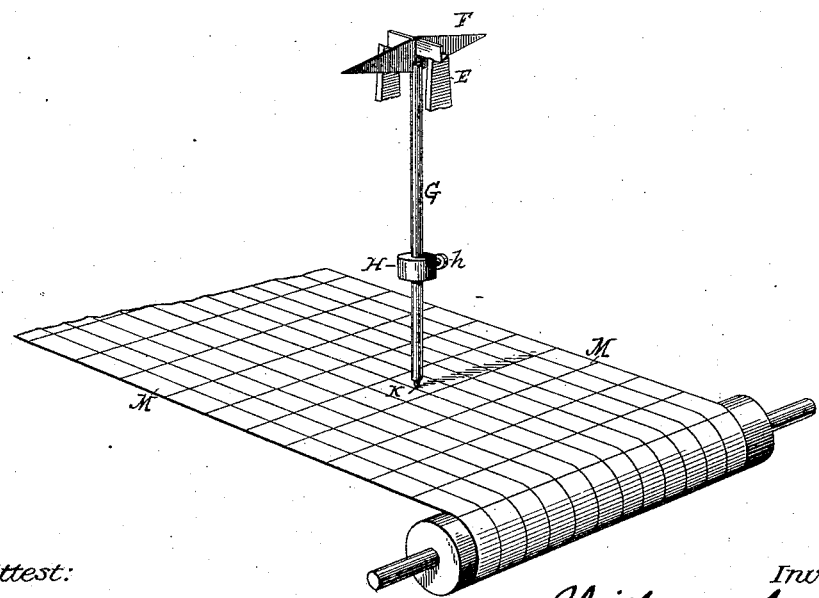

In the drawings hereto annexed, Figure 1 is a vertical central section of the apparatus invented by me. Fig. 2 is a perspective illustrating the devices for recording the deflection of the needle.

A is a base; B B, standards, and C a coil of any kind, such as ordinarily used in tangent-galvanometers.

D is a plate upon which the coil is mounted in a horizontal position. Upon this plate are set standards E, upon which is mounted, by knife-edges, a short bar magnet or needle, F, weighted or balanced so as to lie in a horizontal position.

G is a light tube, of aluminium, for example, attached to the needle F at its center, and extending vertically through a slot in the plate D. Upon the tube G, is a small sliding weight, H, in which is a set-screw, $h$.

K is a light pin inserted in the hollow tube or pointer G, and adapted to slide freely therein.

On the base A is laid a plate, L, of any material with a smooth surface, upon which graduations may be marked. If a current be passed through the coil C, the needle is deflected and the tube G moved out of the vertical position. The end of pin K remains in contact with the plate L, the pin sliding out of the tube. The distance from the point at which the pin rests to the starting-point represents the tangent of the angle through which the needle and tube have deflected. It is obvious that a scale may be laid off on either side of the zero or starting point in a straight line to indicate the value of these tangents.

By substituting for the plate L a traveling band of paper (represented by M) marked off into arbitrary squares the pin may be made to trace a line from which the amount of current that has passed through the circuit in a given time may be readily computed. To obtain this record the pin may be made partly or wholly of plumbago, or the paper may be chemically prepared and a current passed through it from the pointer.

To adjust the instrument, it is simply necessary to move the weight H up or down until the pin K gives the proper reading for a current of known strength. This means of adjustment makes it an easy and simple matter to adjust or standardize the instruments.

The instrument, though more particularly designed for use with circuits carrying very powerful currents, is nevertheless capable of remarkable accuracy, and may be used generally for those purposes to which instruments of this class are commonly applied.

The details of mechanical construction are capable of great variation, particularly with respect to the indication of the tangent by means of the tube or pointer G.

Without, therefore, confining myself to such details as are here exhibited, what I claim as my invention is—

1. The combination, with a horizontal coil, of a magnet or magnetized needle mounted in the center of the coil, in the plane of the same, and capable of deflection in a vertical plane only, a pointer attached to said needle, and a rectilinear scale over which the pointer travels, all substantially as herein set forth.

2. The combination, with a horizontal coil, of a magnet or magnetized needle mounted in the center of the coil, in the plane of the same, and capable of deflection in a vertical plane only, a pointer attached to the needle, and an adjustable weight thereon, substantially as set forth.

3. The combination, with a horizontal coil, of a magnet or magnetized needle mounted in the center of the coil, in the plane of the same, and capable of deflection in a vertical plane only, a tube or hollow pointer attached to the needle, a sliding pin within said tube or pointer, and a scale over which the needle moves, all substantially as set forth.

4. The combination, with a horizontal coil, of a magnetized needle mounted in the center of the coil, in the plane of the same, a tube attached to the needle, an adjustable weight on the tube, a sliding pin within said tube, and a scale or its equivalent upon which the pin rests, all substantially as set forth.

5. The combination, with a coil C, of a balanced needle or magnet, F, mounted on knife-edges in its center, the pointer or tube G, adjustable weight H, sliding pin K, and a scale over which the point of said pin moves, as and for the purpose specified.

In testimony whereof I have hereunto set my hand this 23d day of November, 1883.

WILLIAM G. DAVID.

Witnesses:
W. FRISBY,
W. H. DOGGETT.